United States Patent

Davidovici et al.

[11] Patent Number: 5,963,583
[45] Date of Patent: Oct. 5, 1999

[54] FUZZY-LOGIC SPREAD-SPECTRUM ADAPTIVE POWER CONTROL

[75] Inventors: Sorin Davidovici, Jackson Heights, N.Y.; Emmanuel Kanterakis, North Brunswick, N.J.

[73] Assignee: Golden Bridge Technology, Inc., West Long Branch, N.J.

[21] Appl. No.: 09/007,026

[22] Filed: Jan. 14, 1998

Related U.S. Application Data

[63] Continuation of application No. 08/536,749, Sep. 29, 1995, Pat. No. 5,719,898.

[51] Int. Cl.[6] .............................. H04B 15/00; H04K 1/00; H04L 27/30
[52] U.S. Cl. ....................... 375/200; 375/207; 455/38.3; 455/522; 706/1
[58] Field of Search ..................................... 375/200, 205, 375/207, 208, 219, 221, 227, 343, 344, 346; 370/319, 311, 332, 335; 455/38.3, 522, 68–70, 88; 364/148.05; 706/1

[56] References Cited

U.S. PATENT DOCUMENTS

| | | | |
|---|---|---|---|
| 5,056,109 | 10/1991 | Gilhousen et al. | 375/1 |
| 5,093,840 | 3/1992 | Schilling | 375/1 |
| 5,179,571 | 1/1993 | Schilling | 375/1 |
| 5,218,618 | 6/1993 | Sagey | 375/1 |
| 5,224,120 | 6/1993 | Schilling | 375/1 |
| 5,228,053 | 7/1993 | Miller et al. | 375/1 |
| 5,245,629 | 9/1993 | Hall | 375/200 |
| 5,257,283 | 10/1993 | Gilhousen et al. | 375/1 |
| 5,265,119 | 11/1993 | Gilhousen et al. | 375/200 |
| 5,299,226 | 3/1994 | Schilling | 375/1 |
| 5,483,550 | 1/1996 | Hulbert | 375/202 |
| 5,559,790 | 9/1996 | Yano et al. | 370/18 |
| 5,566,165 | 10/1996 | Sawahashi et al. | 370/18 |
| 5,702,059 | 12/1997 | Chu et al. | 235/462 |
| 5,719,898 | 2/1998 | Davidovici et al. | 375/200 |

FOREIGN PATENT DOCUMENTS

| | | |
|---|---|---|
| 2229609 | 9/1990 | United Kingdom . |
| 9221196 | 11/1992 | WIPO . |
| 9307702 | 4/1993 | WIPO . |

OTHER PUBLICATIONS

R.F. Ormondroyd, "Power Control for Spread–Spectrum Systems", Conference on Communications Equipment and Systems; Apr. 20–22, 1982, pp. 109–115.

Gao et al, "Power control for mobile DS/CDMA System using a modified Elman Neural Network Controller", IEEE 47th Vehicular Tech. Conf., May 1997.

Chang et al, "Adaptive Fuzzy Power control for CDMA Mobile Radio Systems", IEEE Transactions on Vehicular Tech. vol. 45, No. 2, May 1996.

*Primary Examiner*—Chi H. Pham
*Assistant Examiner*—Bryan Webster
*Attorney, Agent, or Firm*—David Newman; Chartered

[57] ABSTRACT

A fuzzy-logic spread-spectrum adaptive power control system comprising a base station and a plurality of remote units. The base station receives a spread-spectrum signal, and samples the despread spread-spectrum signal at a peak correlation time of the data channel, and at a non-peak correlation time of the data channel. This in turn generates a signal level and a noise level, respectively. A signal-to-noise ratio calculator generates a signal-to-noise ratio from the signal level and the noise level. A fuzzy-logic controller compares the signal-to-noise ratio to a set of predetermined thresholds, and using a state machine, generates a control signal which is thereby transmitted to the remote unit, indicating the amount by which to increase or decrease transmitted power. Each remote unit demodulates the control signal, and a transmitter controller adjusts a power level of the remote-unit spread-spectrum transmitter.

7 Claims, 7 Drawing Sheets

FUZZY-LOGIC SPREAD-SPECTRUM ADAPTIVE POWER CONTROL

This patent stems from a continuation application of a patent application entitled, FUZZY-LOGIC SPREAD-SPECTRUM ADAPTIVE POWER CONTROL, having Ser. No. 08/536,749, and filing date Sep. 29, 1995, now U.S. Pat. No. 5,719,898. The benefit of the earlier filing date of the parent patent application is claimed pursuant to 35 U.S.C. § 120.

BACKGROUND OF THE INVENTION

This invention relates to spread-spectrum communications, and more particularly to an adaptive power controller using a state machine, for controlling a power level transmitted by a remote unit.

DESCRIPTION OF THE RELEVANT ART

The need for a means of controlling the power from remote users, simultaneously transmitting to and being received at a common base station, is well known and documented in the literature. As an example, consider the paper by Ormondroyd entitled, POWER CONTROL FOR SPREAD-SPECTRUM SYSTEMS published in April 1982 from the Conference on Communications Equipment and Systems in the United Kingdom and associated with the IEEE Communications Society (USA). In suggesting a particular power control solution, Ormondroyd references five additional papers dating back to 1979 which also describe the need for and means of effecting power control.

In recent times, several patents have been issued to inventors who have demonstrated their ingenuity by preparing algorithms which they employ to implement the power control required. These patents include:

U.S. Pat. No. 5,093,840, entitled ADAPTIVE POWER CONTROL FOR A SPREAD SPECTRUM TRANSMITTER and incorporated herein by reference, issued to Schilling on Mar. 3, 1992 and describes an apparatus for adaptive-power control (APC) of a spread-spectrum transmitter of a mobile station operating in a cellular-communications network using spread-spectrum modulation. A base station transmits a generic (pilot) spread-spectrum signal and an APC-data signal. The APC-data signal includes a threshold to be used by the mobile station. The mobile station has an acquisition circuit for acquiring and decoding the pilot spread-spectrum signal, a detector for detecting a received power level of the pilot spread-spectrum signal, a decoder for decoding the APC-data signal as a threshold, a differential amplifier for generating a comparison signal by comparing the received power level to the threshold, a transmitter for transmitting a transmitter spread-spectrum signal, and a variable-gain device which, in response to the comparison signal indicating an increase or decrease, adjusts a transmitter-power level of the transmitter spread-spectrum signal. Key to this patent is the APC-data signal which provides a threshold for comparing a received power level, and determining whether to increase or decrease the transmitted power level.

U.S. Pat. No. 5,257,283, entitled SPREAD SPECTRUM TRANSMITTER POWER CONTROL METHOD AND SYSTEM and incorporated herein by reference, issued to Gilhousen et al., on Oct. 26, 1993 and discloses a power control system for a cellular mobile telephone system in which system users communicate information signals between one another via at least one cell site using code division multiple access spread-spectrum communications signals. Cell-site transmit signal power is measured as received at the mobile unit. Transmitter power is adjusted at the mobile unit in an opposite manner with respect to increases and decreases in received-signal power. A power control feedback scheme also may be used. At the cell-site communicating with the mobile unit, the mobile unit transmitted power is measured as received at the cell-site. A command signal is generated at the cell-site and transmitted to the mobile unit for further adjustment of mobile unit transmitter power corresponding to deviations in the cell-site received signal power.

U.S. Pat. No. 5,299,226, entitled ADAPTIVE POWER CONTROL FOR A SPREAD SPECTRUM COMMUNICATIONS SYSTEM AND METHOD and incorporated herein by reference, issued to Schilling on Mar. 29, 1994, and discloses an adaptive power control method and apparatus for spread-spectrum communications, for use with a mobile station operating in a cellular communications network. A base station transmits a first spread-spectrum signal. A mobile station has an automatic-gain-control (AGC) circuit for generating an AGC-output signal from a received signal. The received signal includes the first spread-spectrum signal and an interfering signal. The mobile station also has a correlator for despreading the AGC-output signal, and a power-measurement circuit which operates in response to processing the received signal with the despread AGC-output signal, for generating a received-power level. The mobile station also has a comparator coupled to the power-measurement circuit for generating a comparison signal by comparing the received-power level to a threshold level, and a transmitter for transmitting a second spread-spectrum signal. A variable-gain device, in response to the comparison signal, adjusts the transmitter-power level of the second spread-spectrum signal.

U.S. Pat. No. 5,386,588, entitled TRANSMISSION POWER CONTROL OF MOBILE RADIOTELEPHONE STATION IN RESPONSE TO BASE STATION CONTROL SIGNAL WHERE BASE STATION DATA IS COLLECTED BY THE MOBILE RADIOTELEPHONE STATION and incorporated herein by reference, issued to Yasuda on Jan. 31, 1995, and discloses transmission power control of a mobile radiotelephone station in which radio communication channels, including control channels and a plurality of communication channels, are set between a plurality of base stations and a plurality of mobile stations within radio zones of the base stations. An outgoing call and an incoming call are controlled and the communication channels are designated via the control channels. A telephone conversation is made via the communication channels, and channels of different frequencies are allocated to different radio zones. Each base station includes a circuit for detecting the received electric field intensity of the mobile station after being passed through the channel. The base station receiver is set such that when the mobile station is moved between the radio zones, the mobile station is consistently connected to the base station whose communication state is satisfactory.

In the foregoing patent disclosures, control signals are sent for determining thresholds based on the signal intensity or power of a received spread-spectrum signal. The prior art does not teach measuring the signal power level of a received spread spectrum signal along with the noise level within the same frequency band and within approximately the same time, for determining a signal-to-noise ratio (SNR). More particularly, these prior art patents compare a received level to a predetermined threshold and increase or decrease power accordingly. They do not teach measuring signal-tonoise ratio at the despreader, while attempting to bound the variation of the signal-to-noise ratio using a state diagram.

Further, the prior art patents do not teach the use of a state diagram for a fuzzy-logic solution to the problem of determining or adjusting the power level in response to the requirements of the environment. For example, in a typical mobile environment, a remote unit might pass through a geographical area, such as between two buildings, and encounter substantial fading. Absent significant adjustment in the power level, such fading could result in signal loss. The foregoing disclosures do not address an adaptive method or a method using artificial intelligence for adjusting the power level of the remote unit to offset the fading process.

SUMMARY OF THE INVENTION

A general object of the invention is an adaptive power control system and method which adapts to dynamically varying fading and shadowing environments.

Another object of the invention is to employ artificial intelligence to control power levels used by remote units.

An additional object of the invention is to base power control on measured levels of signal power, noise and interference power, on the same frequency band and close in proximity of time.

A further object of the invention is an adaptive power control system which works in a dynamically changing city or office environment.

According to the present invention, as embodied and broadly described herein, a fuzzy-logic spread-spectrum adaptive power control system is provided comprising a base station and a plurality of remote units. The base station includes a base antenna, a pilot-channel despreader, a sample-and-hold controller, a data channel despreader, a sample-and-hold circuit, a signal-to-noise ratio calculator, a fuzzy-logic controller, and a base spread-spectrum transmitter. The circuits required can be built analog or digital.

The base antenna receives a first spread-spectrum signal. The first spread-spectrum signal includes at least one data channel, and may include a pilot channel. The pilot-channel despreader despreads a pilot channel signal embedded in the first spread-spectrum signal. The pilot-channel despreader generates a timing signal from the despread pilot channel signal. The pilot channel is optional, and the timing signal alternatively may be obtained from the data channel.

Using the timing signal, the sample-and-hold controller generates a first control signal and a second control signal. The data-channel despreader despreads a data channel signal embedded in the first spread-spectrum signal as a despread signal. The sample-and-hold circuit, in response to the first control signal, samples the despread signal at a peak correlation time of the data channel signal, and generates from the despread signal a signal level. In response to the second control signal, the sample-and-hold circuit samples the despread signal at a non-peak correlation time of the data channel signal to generate from the despread signal a noise level. The noise level measured includes interference caused by other users as well as thermal noise.

The signal-to-noise ratio calculator generates a signal-to-noise ratio from the signal level and the noise level. The fuzzy-logic controller compares the signal-to-noise ratio to a set of predetermined thresholds. If the number of thresholds employed were M−1, then there are M levels which can be represented by an N bit word where $2^N=M$. Thus, depending on the signal-to-noise ratio, the fuzzy logic controller selects the appropriate N bit word, which serves as an N-bit control signal. The base spread-spectrum transmitter transmits a second spread-spectrum signal which includes the N-bit control signal outputted from the fuzzy-logic controller. The second spread-spectrum signal is radiated by the base antenna.

Each remote unit includes a remote-unit antenna, a remote-unit spread-spectrum receiver, a remote-unit spread-spectrum transmitter, and a transmitter controller. The remote-unit spread-spectrum receiver receives the second spread-spectrum signal and demodulates from the second spread-spectrum signal the appropriate N-bit word embedded in the second spread-spectrum signal as the N-bit control signal. The output of the remote-unit spread-spectrum receiver is a demodulated-control signal. The demodulated-control signal actuates the transmitter controller to adjust a power level of the remote-unit spread-spectrum transmitter. The remote-unit spread-spectrum transmitter transmits the first spread-spectrum signal, which includes the pilot channel and the data channel.

The present invention also includes a fuzzy-logic spread-spectrum adaptive power method which comprises the steps of receiving at a base station a first spread-spectrum signal which has a pilot channel and a data channel, and despreading a pilot channel signal embedded in the first spread-spectrum signal. The method also includes generating from the despread pilot channel signal a timing signal, and from the despread pilot channel signal, a first control signal and a second control signal. The use of a pilot channel is optional, and the timing signal alternatively may be obtained directly from the data channel.

The method further includes despreading at the base station a data channel signal embedded in the first spread-spectrum signal as a despread signal. Using the first control signal, the despread signal is sampled at a peak correlation time of the data channel signal to generate a signal level. In response to the second control signal, the despread signal is sampled at a non-peak correlation time of the data channel signal to generate a noise level. The method generates a signal-to-noise ratio from the signal level and the noise level, and compares, at the base station, the signal-to-noise ratio to a set of predetermined thresholds. The signal-to-noise ratio is quantized by comparing it to predetermined thresholds, and the method generates an N bit word where $2^N$ is the number of quantization levels. The method includes transmitting from the base station the N bit word, denoted herein as an N-bit control signal, as part of a second spread-spectrum signal. The appropriate N-bit word is transmitted periodically every T seconds. In the preferred configuration, $T_{APC}$ should be between 250 microseconds and 500 microseconds, although any $T_{APC}$ is possible.

The method includes receiving, at a remote unit, the second spread-spectrum signal, and demodulating from the second spread-spectrum signal, the N-bit word embedded in the second spread-spectrum signal, as a demodulated-control signal. The method thereby adjusts at the remote unit, in response to the demodulated-control signal, a power level of the first spread-spectrum signal which is transmitted from the remote unit.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
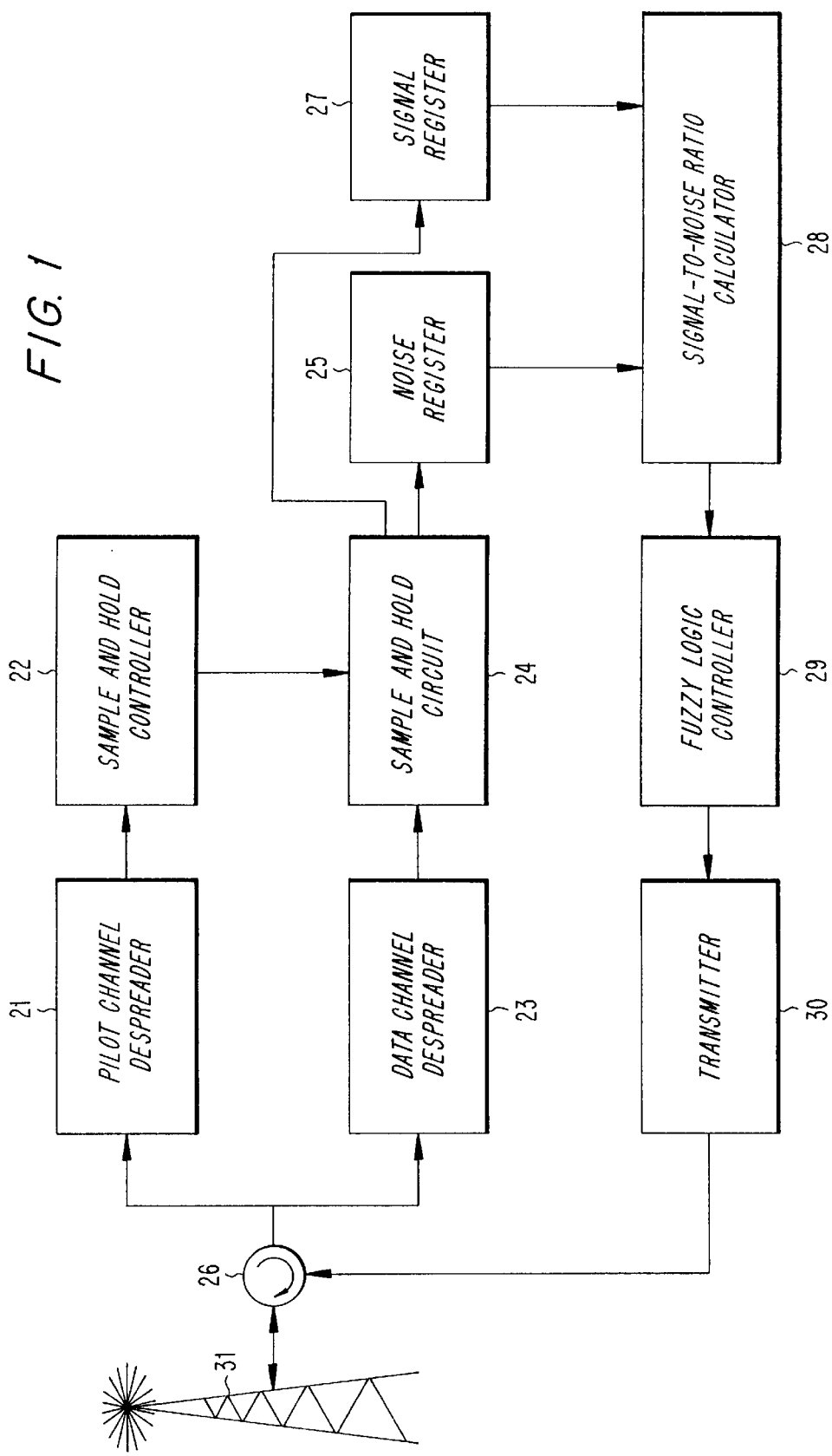
FIG. 1 is a block diagram of a base station with a fuzzy-logic controller.

Reference now is made in detail to the present preferred embodiments of the invention, examples of which are illustrated in the accompanying drawings, wherein like reference numerals indicate like elements throughout the several views.

The fuzzy-logic spread-spectrum adaptive power control (APC) system provides a new and innovative technique for achieving power control in a code division multiple access (CDMA) or code division multiplex (CDM), spread-spectrum environment. The APC system also can work in a time division duplex (TDD) code division multiple access (CDMA) system. The technique employs sampling a spread-spectrum signal and sampling noise within the same channel, and combining the two samples to generate a signal-to-noise ratio (SNR). The signal-to-noise ratio is used with fuzzy logic for determining by how much to increase or decrease the power transmitted by a remote unit. The APC system can be constructed using either analog or digital circuits, or a combination of both.

More particularly, the present invention includes a base station and a plurality of remote units. Each base station includes base-pilot means, base-controlling means, base-despreading means, base-sample-and-hold means, base-signal-to-noise ratio means, base-fuzzy means, and base-transmitting means. The base-controlling means is coupled to the base-pilot means. Alternatively, the base-controlling means is coupled to the base-despreading means, if the base-pilot means were not used. The base-sample-and-hold means is coupled between the base-controlling means, the base-despreading means, and the base-signal-to-noise ratio (base-SNR) means. The base-fuzzy means is coupled between the base-SNR means, and the base-transmitting means.

The base-pilot means receives a first spread-spectrum signal. The first spread-spectrum signal has a pilot channel and a data channel. The base-pilot means despreads a pilot channel signal embedded in the first spread-spectrum signal and generates from the despread pilot channel signal, a timing signal. Using the timing-signal, the base-controlling means generates a first control signal and a second control signal.

The base-pilot means is optional. As an alternative, a timing signal may be derived from a data channel signal embedded in the first spread-spectrum signal.

The base-despreading means despreads the data channel signal embedded in the first spread-spectrum signal as a despread signal. In response to the first control signal, the base-sample-and-hold means samples the despread signal at a peak correlation time of the data channel signal to generate from the despread signal, a signal level. A peak correlation time is defined herein to be a time when the correlation output of the base-despreading means is at a peak, i.e., the data channel signal embedded in the first spread-spectrum signal achieves a peak correlation with either a matched filter or a decorrelator embedded in the base-despreading means. In response to the second control signal, the base-sample-and-hold means samples the despread signal at a non-peak correlation time of the data channel signal to generate from the despread signal, a noise level. A non-peak correlation time is defined herein to be a time when the data channel signal embedded in the first spread-spectrum signal does not have a correlation with the correlator or the matched filter as used by the base-despreading means.

If the timing signal were to be derived from the data channel signal, then the base-despreading means would include means for extracting or generating the timing signal from the data channel signal.

The "signal power level" is equal to $$P_S + \frac{P_N + P_I}{P_G}$$

Where:
$P_S$=Signal Power
$P_I$=Interferene Power
$P_N$=Noise Power
$P_G$=Processing Gain The "noise power level" is approximately equal to $$\frac{P_N + P_I}{P_G}$$

therefore "signal power level" minus "noise power level" is approximately equal to the signal power $P_S$ and $$\frac{P_S}{P_N + P_I} = SNR$$

The base-SNR means generates a signal-to-noise ratio from the signal level and the noise level, from the base-sample-and-hold means. The base-fuzzy means stores the signal-to-noise ratio for later comparisons. Also, the base-fuzzy means compares the signal-to-noise ratio to a set of predetermined thresholds and generates a signal having N bits when the signal-to-noise ratio falls within one of $2^N$ levels. Alternatively, the base-fuzzy means may average a plurality of stored signal-to-noise ratios, and compare the averaged signal-to-noise ratio to the predetermined levels. Alternatively, the fuzzy-logic controller can use the quantized SNR and the rate of change of SNR to determine how much correction is required. The signal having N-bits is also denoted herein as an N-bit control signal, and is used for signalling, from the base station to a remote unit, by how much to increase or decrease a power level.

The base-transmitting means transmits the appropriate N-bit signal, as outputted from the fuzzy-logic controller, as part of a second spread-spectrum signal.

A remote unit includes remote-receiving means, remote-transmitting means, and remote-controlling means. The remote-controlling means is coupled between the remote-receiving means and the remote-transmitting means.

The remote-receiving means receives the second spread-spectrum signal transmitted from the base station. The remote-receiving means demodulates from the second spread-spectrum signal, the N-bit control signal embedded in the second spread-spectrum signal, as a demodulated-control signal. In response to the demodulated-control signal, the remote-controlling means. adjusts a power level of the remote-transmitting means. The remote-transmitting means transmits the first spread-spectrum signal with the power level as adjusted by the remote-controlling means.

In the exemplary arrangement shown in FIG. 1, the base station is depicted wherein the base-pilot means is embodied as a pilot-channel despreader 21 coupled through an isolator 26 to an antenna 31. In a TDD CD MA system, the isolator 26 alternatively may be embodied as a switch. The base-despreading means is embodied as a data-channel despreader 23 coupled to the isolator 26 and the sample-and-hold means is shown as a sample-and-hold circuit 24. The base-controlling means is embodied as a sample-and-hold controller 22 coupled between the pilot-channel despreader 21 and the sample-and-hold circuit 24. The base-signal-to-noise ratio means is illustrated as a signal-to-noise ratio calculator 28 coupled through noise register 25 and signal register 27 to the sample-and-hold circuit 24. The base fuzzy means is illustrated as a fuzzy-logic controller 29 coupled to the signal-to-noise ratio calculator 28. The base-transmitting means is illustrated as a spread-spectrum transmitter 30 coupled between the fuzzy-logic controller 29 and the isolator 26.

The base antenna 31 receives the first spread-spectrum signal which includes a data channel. The first spread-spectrum signal may optionally include a pilot channel. If the first spread-spectrum signal included a pilot channel, then the pilot-channel despreader 21 despreads a pilot channel signal embedded in the first spread-spectrum signal, and from the despread pilot channel signal, generates a timing signal. If the pilot channel were not used, then the timing signal may be derived from a data channel signal. A matched filter or correlator, by way of example, may be used for acquiring such a timing signal.

In response to the timing signal, the sample-and-hold controller 22 generates a first control signal and a second control signal. The first control signal and the second control signal are generated at different points in time, so that the first control signal occurs when a peak correlation occurs at the output of the data-channel despreader 23, of the received data channel signal. The second control signal is generated at a point later in time so that essentially noise is at the output of the data-channel despreader 23. Techniques for extracting and generating a timing signal from a despread data channel signal are well known in the art.

The data-channel despreader 23 despreads the data channel signal embedded in the first spread-spectrum signal as a despread signal. If a pilot channel were not used or a pilot channel signal were not embedded in the first spread-spectrum signal, then the data-channel despreader 23 additionally can extract a timing signal or generate a timing signal from the despread data channel signal.

In response to the first control signal, the sample-and-hold circuit 24 samples the despread signal from the data-channel despreader 23 at a peak correlation time of the data channel signal to generate from the despread signal a signal level. In response to the second control signal, the sample-and-hold circuit 24 samples the despread signal at a non-peak correlation time of the data channel signal to generate from the despread signal a noise level. The first register 25, also denoted as a noise register, stores the noise level. The second register 27, also denoted as a signal register, stores the signal level.

The signal-to-noise ratio calculator 28 generates a signal-to-noise ratio from the signal level and the noise level.

Using the signal-to-noise ratio, the fuzzy-logic controller 29 can store the signal-to-noise ratio for later comparisons if desired. Also, using the signal-to-noise ratio, the fuzzy-logic controller 29 quantizes the signal-to-noise ratio to an N bit word and generates an N-bit control signal.

The base spread-spectrum transmitter 30 transmits the appropriate N-bit control signal from the fuzzy-logic controller 29, every $T_{APC}$ seconds, in a second spread-spectrum signal. The second spread-spectrum signal passes through the isolator 26 and is radiated by base antenna 31.

Figure 2:
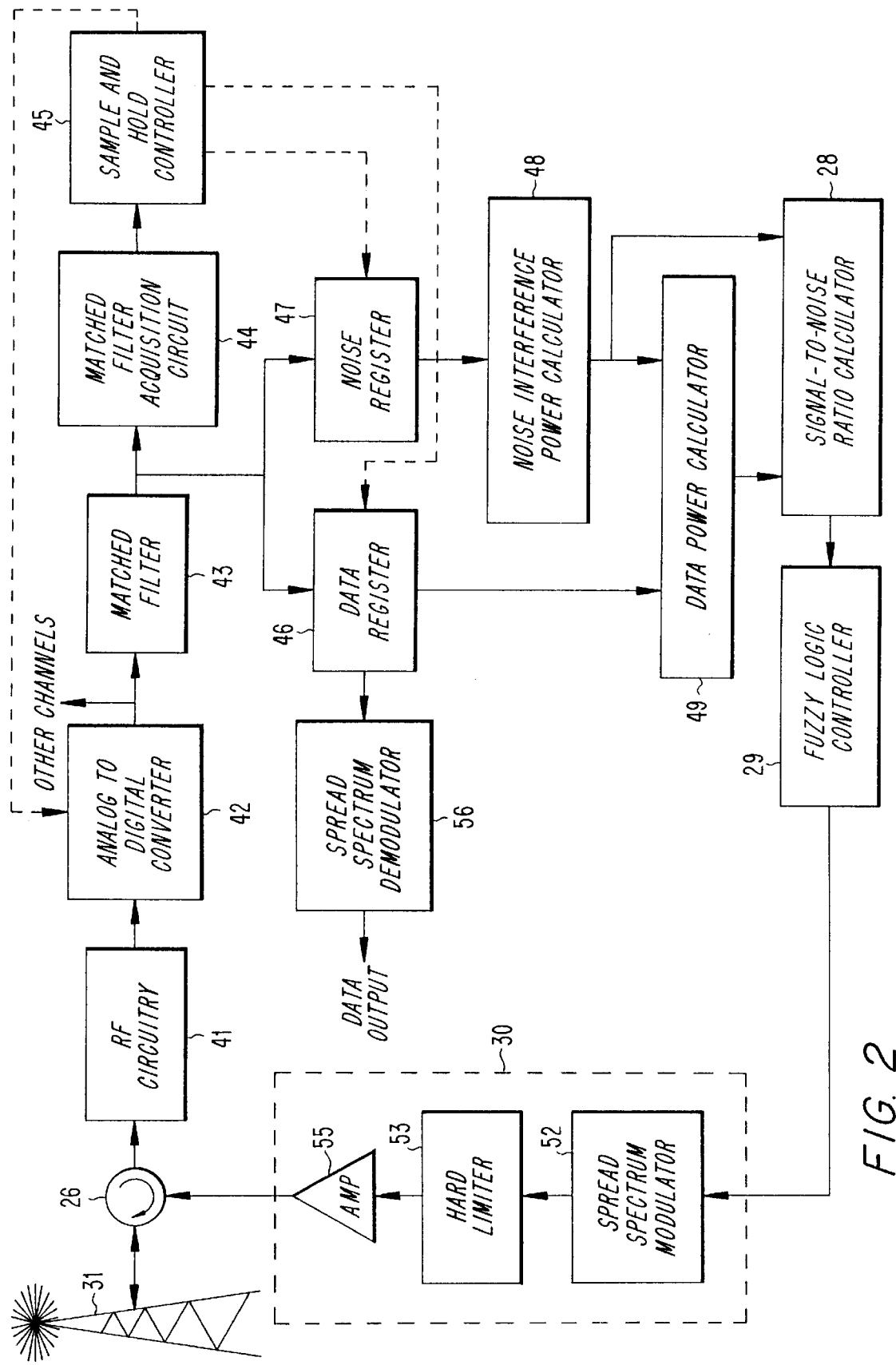
FIG. 2 is a more detailed, alternative, block diagram of a base station with a fuzzy-logic controller.

FIG. 2 illustratively shows an alternative preferred embodiment of the base station. In FIG. 2, the base-controlling means is embodied as a matched filter acquisition circuit 44 and sample-and-hold controller 45. The sample-and-hold means is shown as an analog-to-digital converter 42. The base-despreading means is embodied as radio frequency (RF) circuitry 41 and matched filter 43. The RF circuitry 41 is coupled through isolator 26 to antenna 31, and through analog-to-digital converter 42 to matched filter 43.

The base-SNR means is embodied as signal-to-noise ratio calculator 28, data-power calculator 49, noise-interference-power calculator 48, data register 46 and noise register 47. The signal-to-noise ratio calculator 28 is coupled through data power calculator 49 to data register 46, and through noise-interference-power calculator 48 to noise register 47. The data power calculator 49 is coupled to the noise interference power calculator 48. The data register 46 and the noise register 47 are coupled to the output of the matched filter 43, and are controlled by a timing signal from sample-and-hold controller 45. The timing signal also controls analog-to-digital converter 42.

The base-fuzzy means is shown as fuzzy-logic controller 29, and the base-transmitting means is embodied as base spread-spectrum transmitter 30. The fuzzy-logic controller 29 is coupled between the signal-to-noise ratio calculator 28 and the base spread-spectrum transmitter 30. The base-spread-spectrum transmitter 30 is coupled through the isolator 26 to the base antenna 31.

The base-spread-spectrum transmitter 30 of FIGS. 1 and 2 may include a spread-spectrum modulator 52, a hard limiter 53 and an amplifier 55. The hard limiter 53 is coupled between the spread-spectrum modulator 52 and the amplifier 55. Other circuits, as is well known in the art, may be included with the base spread-spectrum transmitter 30.

In FIG. 2, the antenna 31 receives and the first spread-spectrum signal and transmits the second spread-spectrum signal. In FIG. 1 or FIG. 2, separate transmit and receive antennas may be employed. Multiple antennas can be used at the transmitter and at the receiver facilities.

The radio frequency (RF) receive circuitry 41 receives the first spread-spectrum signal, amplifies the signal and then shifts this signal to baseband frequencies. The in-phase component and quadrature-phase component are determined or extracted from the first spread-spectrum signal at baseband previously set forth, the first spread-spectrum signal includes a data channel. For this embodiment, a pilot channel is not used, thus, timing signals are derived from the data channel.

The analog-to-digital converter 42 converts the in-phase and quadrature-phase components of the baseband signal from RF circuitry 41 into digital signals. Timing for analog-to-digital converter 42 is provided by the sample-and-hold controller 45.

The output of the analog-to-digital converter 42 goes to the matched filter 43, which is used for each data channel.

Only one data channel is shown, however multiple data channels would be used in practice. The matched filter 43 may be used to detect the pilot channel, if used, and to detect the data channel. Thus, in this preferred embodiment, by way of example, 8192 chips might be used in the pilot code; thus the pilot matched filter is $L_p$=8192 chips long. The data channel matched filter length $L_d$ depends on the chip rate $f_c$ and data rate $f_d$, i.e., $L_d=f_c/f_d$. The length $L_d$ of chips of the data channel is usually much less than the length $L_p$ of the chips of the pilot channel.

The matched filter acquisition circuit 44 includes the acquisition and tracking circuits used to ensure that any frequency offset and analog-to-digital sampling error is minimized. In addition, the matched filter acquisition circuit 44 determines at which time the matched filter 43 should be sampled to obtain the data output. The actual control of sampling is performed in the sample-and-hold controller 45. The output data is stored in data register 46.

If the matched filter 43 were sampled at times other than the correct time for a peak signal sampling, then the output obtained is approximately equal to the interference from all channels plus the thermal noise. This value is stored in the noise register 47. The noise and interference power is calculated in the noise interference power calculator 48.

It is well known that the despread output voltage $V_0(t)$ contained in data register 46 is approximately:

$$V_o(t) = \sqrt{P_1}\, d_1(t) + \sum_{i=2}^{N} d_i(t)\sqrt{P_i}\,\overline{g_i(t)g_1(t)} + \overline{n(t)g_1(t)}$$

where, for simplicity, assume that a first data channel is being measured; $P_1$ is the true power received from the first remote unit and $d_1\pm 1$ is the bit transmitted; $P_i$ is approximately equal to the power of the $i^{th}$ remote unit, where $d_i\pm 1$; n(t) is the thermal noise with power N as measured in the data bandwidth; processing gain (PG) is the number of chips per data bit; and K is the number of channels used.

Then from this equation, the term $$\frac{\sum_{i=1}^{K}\sqrt{P_i}\, d_i + n}{\sqrt{PG}}$$

is the interference due to all data channels and noise. The total interference and noise ratio $P_{I+N}$ is $$P_{I+N} \simeq \frac{KP_{AVGE}+N}{PG}$$

Then the signal-to-noise ratio is $$SNR = \frac{P_1}{KP_{AVGE}+N}PG$$

The value determined by noise interference power calculator 48 is approximately equal to $P_{I+N}$ ($KP_{avge}$+N)/PG.

Subtracting $P_{I+N}$ in the noise interference power calculator 48 from the power of $V_o$, which is stored in data register 46, yields an approximation of the signal power $P_1$ in the first data channel. This subtraction is performed in the data-power calculator 49, and the SNR is determined in the signal-to-noise ratio calculator 28.

Fuzzy-Logic Controller

The fuzzy-logic spread-spectrum adaptive power control system functions to ensure that the signal-to-noise ratio (SNR) remains approximately constant even in the presence of a multitude of users operating in independently fading Rayleigh or Rician channels.

For example, if the signal-to-noise-ratio estimate were compared a threshold $P_G$ equal to 6 dB, then the difference is $e_n$. One fuzzy-logic controller configuration, by way of example follows the rules:

| Present State+ | $e_n$(dB) | δ(dB)* | Next State+ |
|---|---|---|---|
| 000 | >3 | −2 | 000 |
|  | ≦3 | +1 | 001 |
| 001 | >0 | −1/2 | 010 |
|  | ≦0 | +1 | 011 |
| 010 | >1 | −1 | 100 |
|  | ≦1 | +1/2 | 101 |
| 011 | >0 | −1/2 | 110 |
|  | ≦0 | +1.5 | 111 |
| 100 | >2 | −1.5 | 000 |
|  | ≦2 | +0.5 | 001 |
| 101 | >0 | −1/2 | 010 |
|  | ≦0 | +1 | 011 |
| 110 | >1 | −1 | 100 |
|  | ≦1 | +1 | 101 |
| 111 | >1 | −1 | 110 |
|  | ≦1 | +2 | 111 |

*δ is the number of decibels (dB) over which the handset must change for this particular set of rules.

Figure 3:
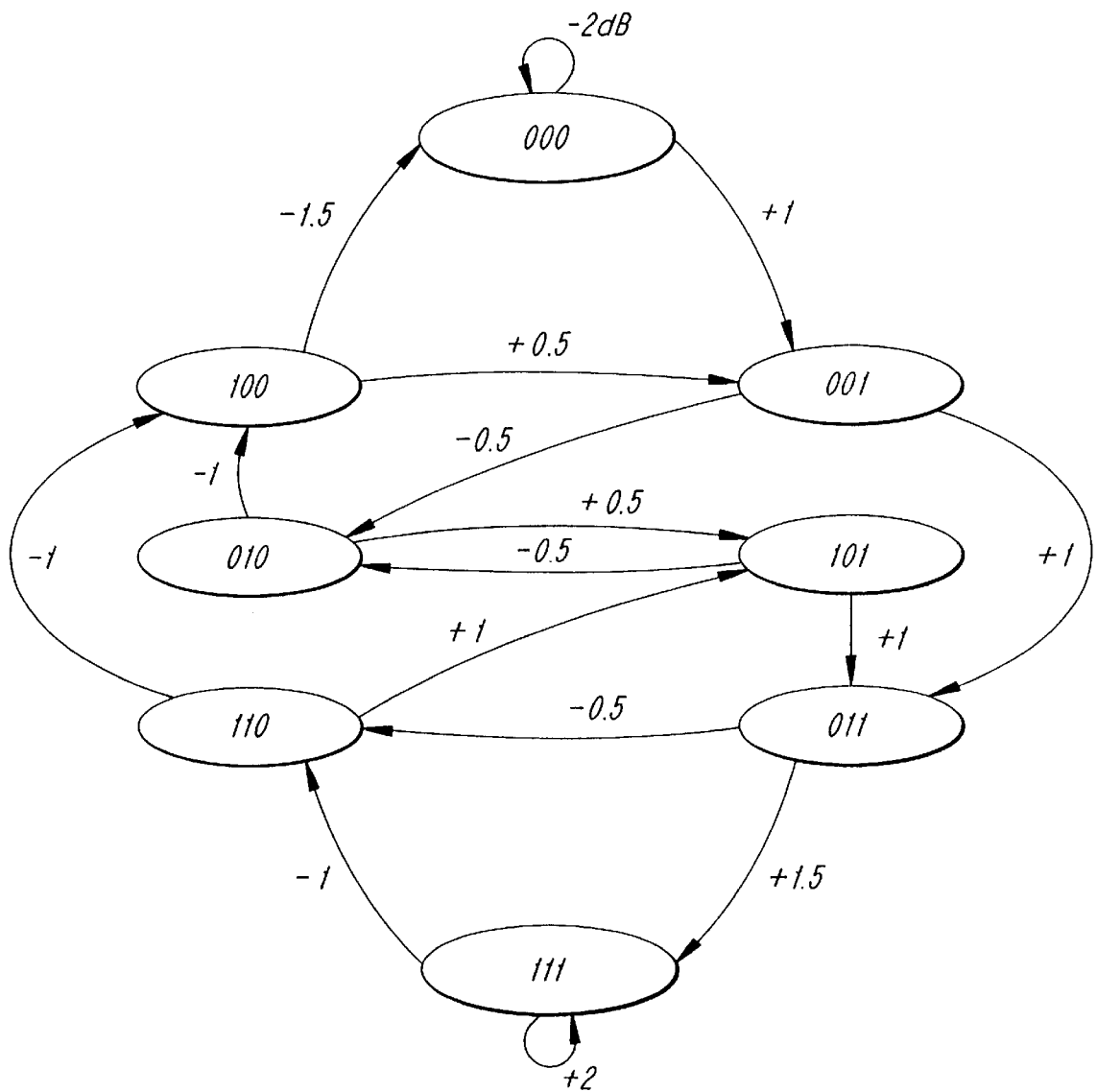
FIG. 3 is a first state diagram of the fuzzy-logic controller.

In the operation of this system, the present state consists of three bits, WXY. The base station sends 1 bit, Z, to the handset, so that the new state is XYZ. These state rules can also be illustrated by the state diagram of FIG. 3.

Figure 4:
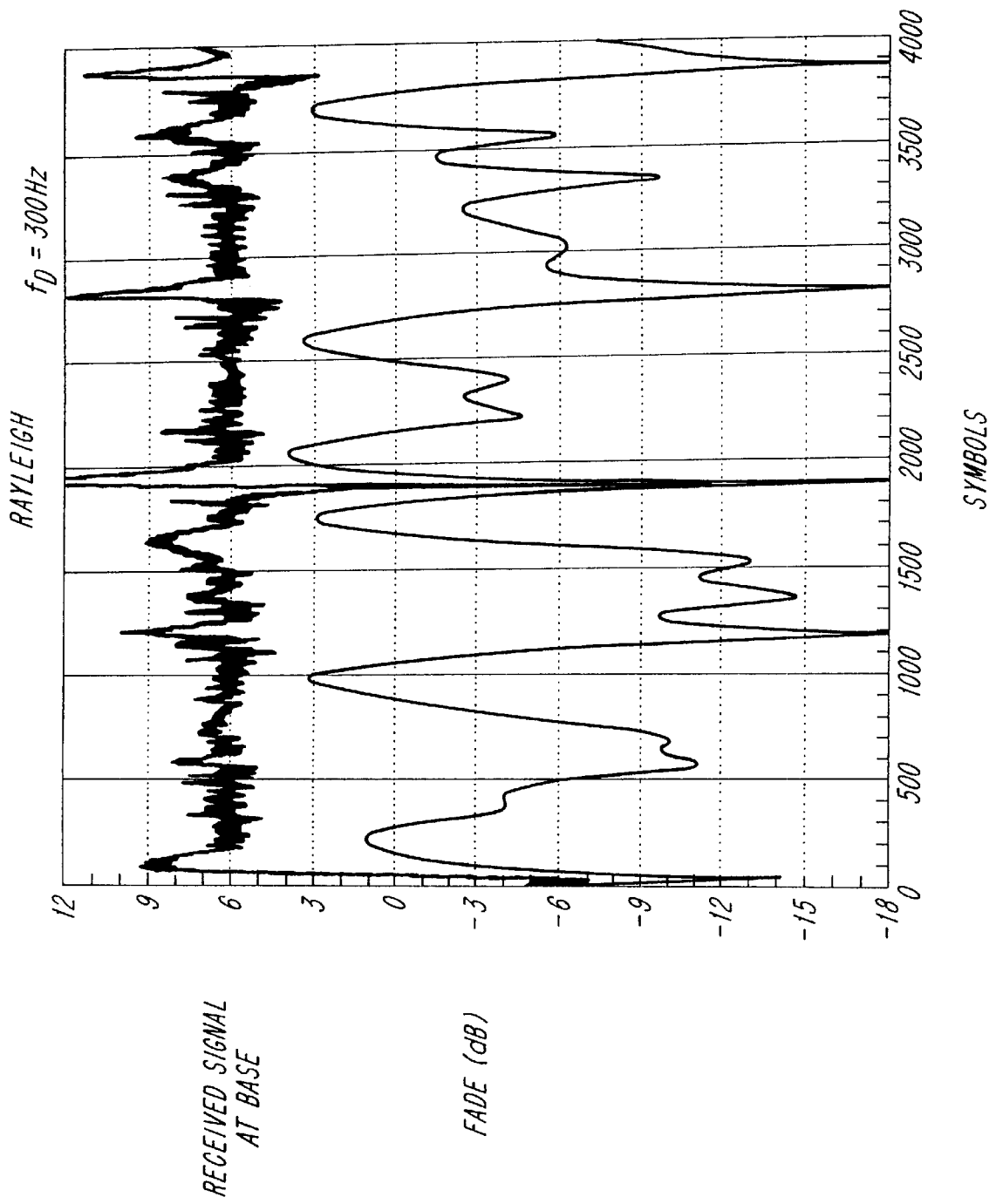
FIG. 4 illustrates a signal fading in a Rayleigh channel.
Figure 5:
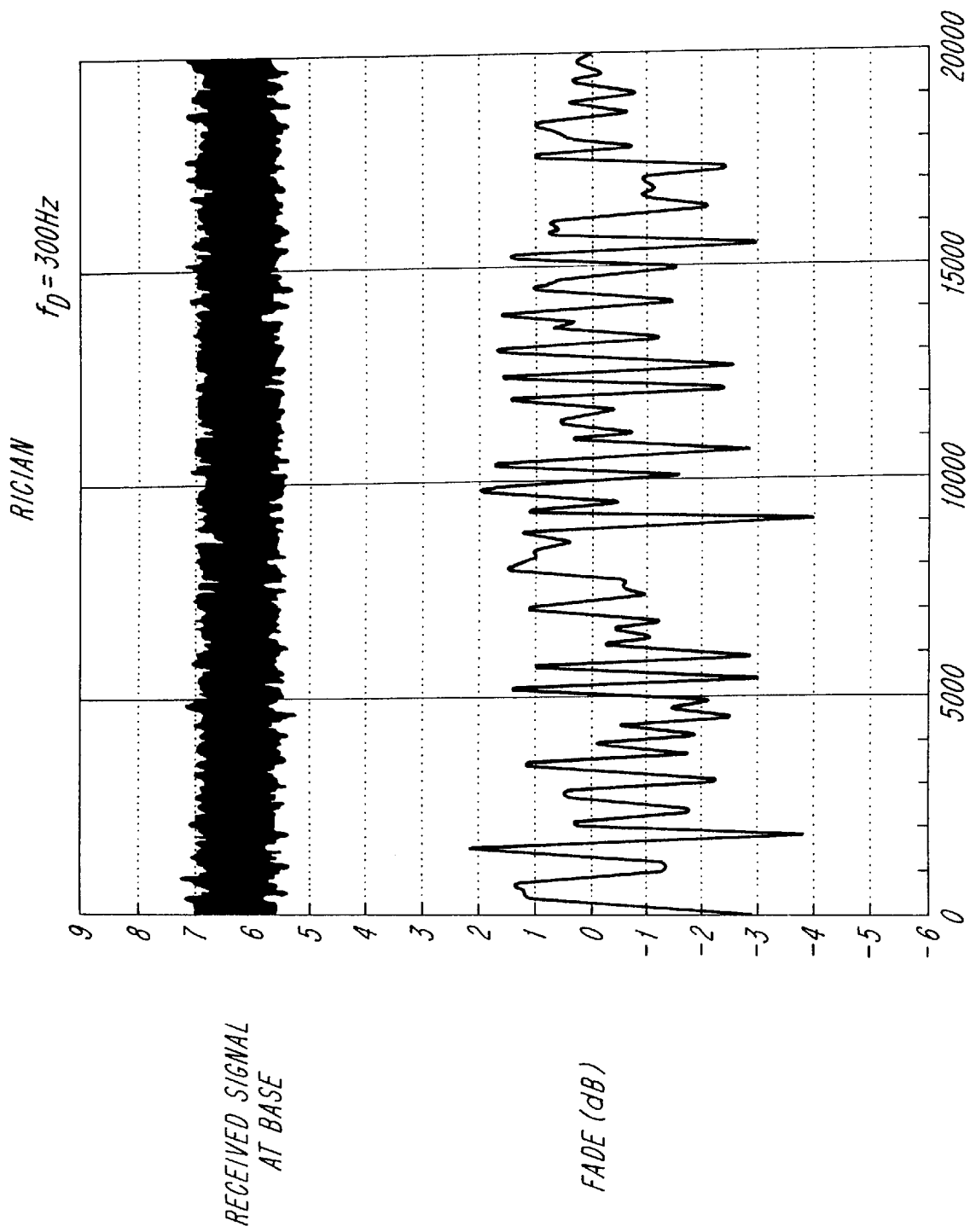
FIG. 5 illustrates a signal fading in a Rician channel.

FIG. 4 shows a signal fading in a typical Rayleigh channel and the received power from a handset. The fade bandwidth is 300 Hz. At 1900 symbols the fade is more than 20 dB deep and the handset cannot increase its power adequately; some of the fade is received at the base station. FIG. 5 shows a Rician fade and the received handset's signal at the base station.

Figure 6:
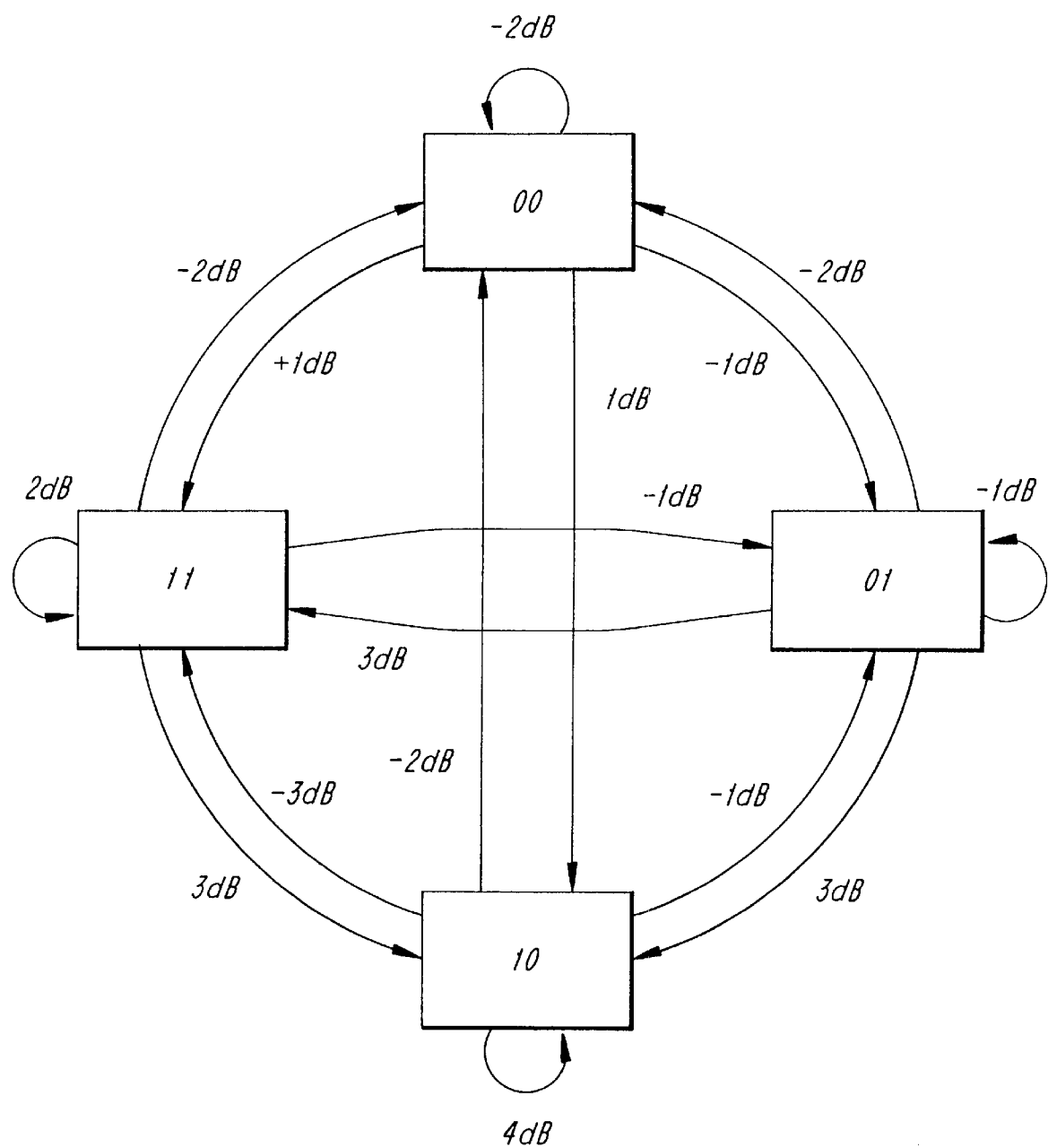
FIG. 6 is a second state diagram of the fuzzy-logic controller.

A second example in which the base station updates its correction at one-half the rate used previously, but sends two bits rather than one bit, so that the effective bit rate is the same, is shown below in Table II. FIG. 6 is a state diagram of Table II.

| | $e_n$ = SNR − 6dB, dB | | | |
|---|---|---|---|---|
| Old State | $e_n$ | $|e_n|$ | δ(dB) | New State |
| 00 | >0 | <1.5 | −1 | 01 |
|  |  | ≧1.5 | −2 | 00 |
|  | ≦0 | <1 | 1 | 10 |
|  |  | ≧1 | 3 | 11 |
| 01 | >0 | <2 | −1 | 01 |
|  |  | ≧2 | −2 | 00 |
|  | ≦0 | <1 | 2 | 10 |
|  |  | ≧1 | 3 | 11 |
| 10 | >0 | <2 | −1 | 01 |
|  |  | ≧2 | −2 | 00 |
|  | ≦0 | <1 | 2 | 10 |
|  |  | ≧1 | 3 | 11 |
| 11 | >0 | <2 | −1 | 01 |
|  |  | <3 | −2 | 00 |
|  |  | ≧3 | −3 | 10 |
|  | ≦0 | ≦0 | 4 | 11 |

Thus, depending on the position in the state diagram and the transition from whatever state the remote unit is in, the base station can signal to the remote unit the amount to increase its power or decrease its power, depending on a previous state. These triggers for increasing and decreasing power levels come from the signal-to-noise ratio calculator 28.

Remote Unit

Figure 7:
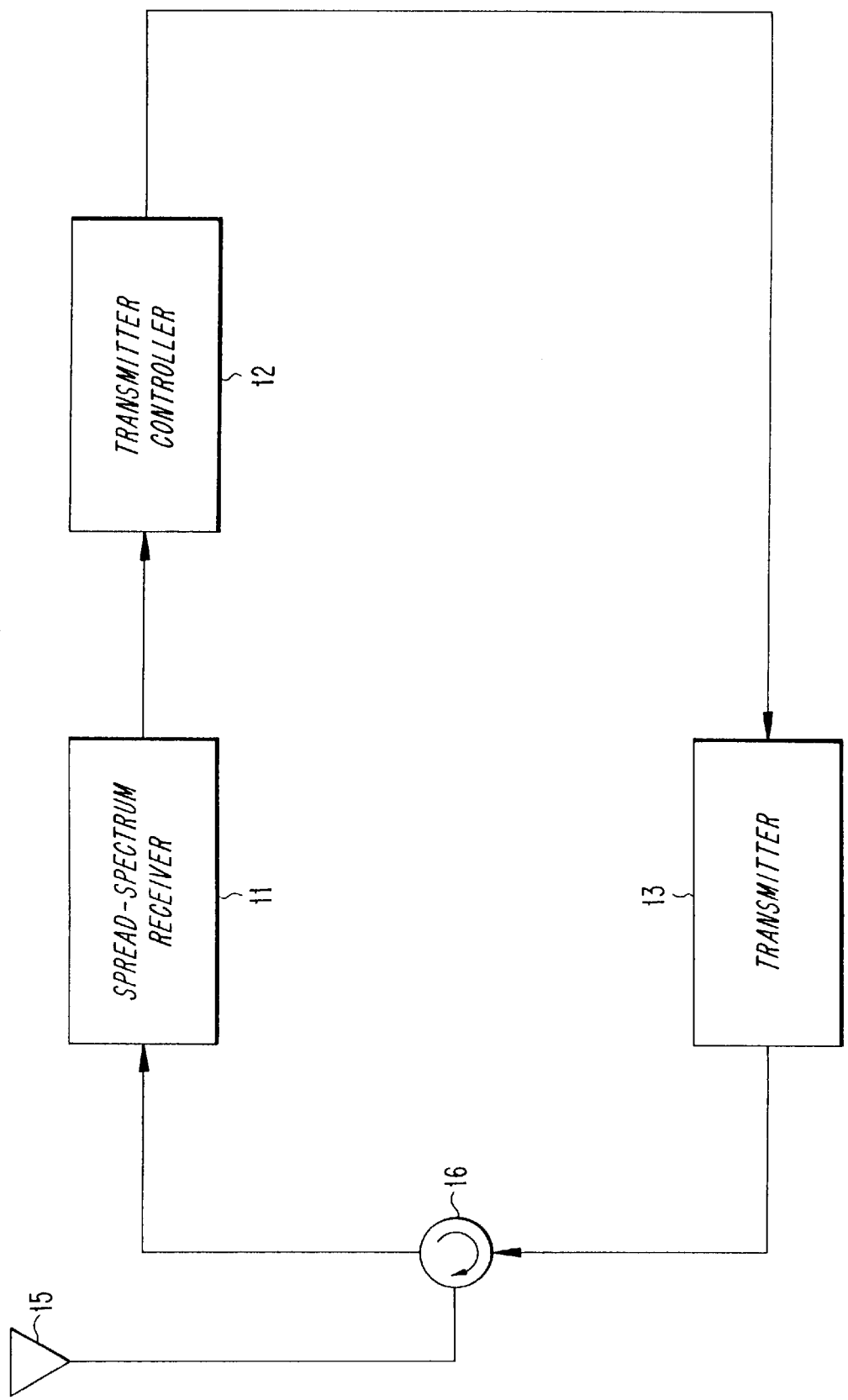
FIG. 7 is a block diagram of a remote unit with a transmitter controller.

At a remote unit, the remote-receiving means may be embodied as a remote-unit spread-spectrum receiver 11, as illustratively shown in FIG. 7. The remote-transmitting means may be embodied as a remote-unit spread-spectrum transmitter 13, and the remote-controlling means may be embodied as a transmitter controller 12. The transmitter controller 12 is coupled between the remote-unit spread-spectrum transmitter 13 and the remote-unit spread-spectrum receiver 11. The remote-unit spread-spectrum receiver 11 and the remote-unit spread-spectrum transmitter 13 are coupled to an isolator 16, which is coupled to a remote-unit antenna 15.

The remote-unit spread-spectrum receiver 11 receives the second spread-spectrum signal transmitted from the base station. The remote-unit spread-spectrum receiver 11 demodulates from the second spread-spectrum signal either of the first signal or the second signal, whichever is embedded in the second spread-spectrum signal, as a demodulated-control signal.

The transmitter controller 12, in response to the demodulated-control signal, adjusts a power level of the remote-unit spread-spectrum transmitter 13. The remote-unit spread-spectrum transmitter 13 transmits the first spread-spectrum signal. As mentioned previously, the first spread-spectrum signal optionally may have a pilot channel.

The present invention also includes a fuzzy-logic spread-spectrum adaptive power method which comprises the steps of receiving at a base station a first spread-spectrum signal which has a pilot channel and a data channel, and despreading a pilot channel signal embedded in the first spread-spectrum signal. The method also includes generating from the despread pilot channel signal a timing signal, and from the despread pilot channel signal, a first control signal and a second control signal. The use of a pilot channel is optional, and the timing signal alternatively may be obtained from the data channel signal.

The method further includes despreading at the base station a data channel signal embedded in the first spread-spectrum signal as a despread signal. Using the first control signal, the despread signal is sampled at a peak correlation time of the data channel signal to generate a signal level. In response to the second control signal, the despread signal is sampled at a non-peak correlation time of the data channel signal to generate a noise level. The method generates a signal-to-noise ratio from the signal level and the noise level, and compares, at the base station, the signal-to-noise ratio to a predetermined threshold. The signal-to-noise ratio is quantized to N bits depending on its relation to predetermined thresholds, and as a result the method generates an N-bit control signal. The method includes transmitting from the base station the N-bit control signal as part of a second spread-spectrum signal.

The method includes receiving, at a remote unit, the second spread-spectrum signal, and demodulating from the second spread-spectrum signal, the N-bit control signal which is embedded in the second spread-spectrum signal, as a demodulated-control signal. The method thereby adjusts at the remote unit, in response to the demodulated-control signal, a power level of the first spread-spectrum signal which is transmitted from the remote unit.

It will be apparent to those skilled in the art that various modifications can be made to the fuzzy-logic spread-spectrum adaptive power control system of the instant invention without departing from the scope or spirit of the invention, and it is intended that the present invention cover modifications and variations of the fuzzy-logic spread-spectrum adaptive power control system provided they come within the scope of the appended claims and their equivalents.

I claim:

1. A fuzzy-logic spread-spectrum system for adaptive power control from a base station comprising:

a base antenna for receiving a first spread-spectrum signal having a pilot channel and a data channel;

a pilot-channel despreader operatively coupled to said base antenna for despreading a pilot channel signal embedded in the first spread-spectrum signal and for generating from the despread pilot channel signal a timing signal;

a sample-and-hold controller, coupled to said pilot-channel despreader, responsive to the timing signal for generating a first control signal and a second control signal;

a data-channel despreader, coupled to said base antenna, for despreading a data channel signal embedded in the first spread-spectrum signal as a despread signal;

a sample-and-hold circuit, operatively coupled to said data-channel despreader and to said sample-and-hold controller, responsive to the first control signal for sampling the despread signal at a peak correlation time of the data channel signal to generate from the despread signal a signal level, and responsive to the second control signal, for sampling the despread signal at a non-peak correlation time of the data channel signal to generate from the despread signal a noise level;

a first register coupled to said sample-and-hold circuit for storing the signal level;

a second register coupled to said sample-and-hold circuit for storing the noise level;

a signal-to-noise ratio calculator coupled to said first register and to second register, for generating a signal-to-noise ratio from the signal level and the noise level;

a fuzzy-logic controller coupled to said signal-to-noise ratio calculator for comparing the signal-to-noise ratio to a predetermined set of thresholds to generate a control signal; and a base spread-spectrum transmitter, coupled to said fuzzy-logic controller, for transmitting the control signal to a remote unit for adjusting a transmitter power level of said remote unit.

2. A fuzzy-logic spread-spectrum system for adaptive power control from a base station comprising:

a base antenna for receiving a spread-spectrum signal;

a sample-and-hold controller for generating a first control signal and a second control signal;

a data-channel despreader, coupled to said base antenna, for despreading a data signal embedded in the spread-spectrum signal as a despread signal;

a sample-and-hold circuit, operatively coupled to said data-channel despreader and to said sample-and-hold controller, responsive to the first control signal, for sampling the despread signal at a peak correlation time of the data signal to generate from the despread signal a signal level and, responsive to the second control signal, for sampling the despread signal at a non-peak correlation time of the data signal to generate from the despread signal a noise level;

a signal-to-noise ratio calculator coupled to said first register and to said second register, for generating a signal-to-noise ratio from the signal level and the noise level;

a fuzzy-logic controller, coupled said signal-to-noise ratio calculator, for comparing the signal-to-noise ratio to a predetermined threshold to generate a control signal; and a base spread-spectrum transmitter, coupled to said fuzzy-logic controller, for transmitting the control signal to remote unit for adjusting a transmitter power level of said remote unit.

3. The fuzzy-logic spread-spectrum system as set forth in claim 2, further comprising:

a first register, coupled between said sample-and-hold circuit and said signal-to-noise ratio calculator, for storing the signal level; and a second register, coupled between said sample-and-hold circuit and said signal-to-noise ratio calculator, for storing the noise level.

4. The fuzzy-logic spread-spectrum system as set forth in claim 2, said remote unit comprising:

a remote-unit antenna;

a remote-unit spread-spectrum receiver coupled to said remote-unit antenna for receiving the control signal;

a remote-unit spread-spectrum transmitter coupled to said remote-unit antenna for transmitting the spread-spectrum signal; and a transmitter controller coupled between said remote-unit spread-spectrum receiver and said remote-unit spread-spectrum transmitter, responsive to the control signal, for adjusting the transmitter power level of said remote-unit spread-spectrum transmitter.

5. The fuzzy-logic spread-spectrum system as set forth in claim 2, further comprising:

a pilot-channel despreader, coupled to said base antenna, for despreading a pilot signal embedded in the spread-spectrum signal and for generating, from the despread pilot signal, a timing signal;

said sample-and-hold controller generating, responsive to the timing signal, the first control signal and the second control signal.

6. A method for adaptive power control of a spread-spectrum signal using fuzzy-logic at a base station, comprising the steps of:

receiving, at the base station, a spread-spectrum signal;

generating a first control signal and a second control signal;

despreading a data signal embedded in the spread-spectrum signal as a despread signal;

sampling, in response to the first control signal, the despread signal at a peak correlation time of the data signal to generate from the despread signal a signal level;

sampling, in response to the second control signal, the despread signal at a non-peak correlation time of the data signal to generate from the despread signal a noise level;

generating a signal-to-noise ratio from the signal level and the noise level;

comparing the signal-to-noise ratio to a predetermined threshold;

generating, responsive to a relationship between the signal-to-noise ratio and the predetermined threshold, a control signal; and transmitting the control signal to a remote unit for adjusting, at the remote unit and responsive to the control signal, a transmitter power level of said remote unit.

7. The method as set forth in claim 6, further comprising the steps of:

despreading a pilot signal embedded in the spread-spectrum signal to generate a timing signal; and generating, using the timing signal, the first control signal and the second control signal.

* * * * *